US007492303B1

(12) United States Patent
Levitan et al.

(10) Patent No.: US 7,492,303 B1
(45) Date of Patent: Feb. 17, 2009

(54) METHODS AND APPARATUS FOR DETECTING THREATS USING RADAR

(75) Inventors: Arthur C. Levitan, Wilton, CT (US); Lester Kosowsky, Stamford, CT (US)

(73) Assignee: Personnel Protection Technologies LLC, Wilton, CT (US)

( * ) Notice: Subject to any disclaimer, the term of this patent is extended or adjusted under 35 U.S.C. 154(b) by 93 days.

(21) Appl. No.: 11/478,026

(22) Filed: Jun. 29, 2006

Related U.S. Application Data

(60) Provisional application No. 60/798,885, filed on May 9, 2006.

(51) Int. Cl.
*G01S 13/00* (2006.01)

(52) U.S. Cl. ............................ 342/22; 342/27; 342/59; 342/188

(58) Field of Classification Search .................. 342/22, 342/27, 28, 59, 66, 82, 89, 115, 118, 176, 342/188, 192, 195, 52–55, 90, 179, 180, 342/191, 196, 42, 44, 45
See application file for complete search history.

(56) References Cited

U.S. PATENT DOCUMENTS

| | | | |
|---|---|---|---|
| 3,707,672 A | 12/1972 | Miller et al. | |
| 4,031,545 A | 6/1977 | Stein et al. | |
| 4,035,797 A * | 7/1977 | Nagy | 342/104 |
| 4,791,427 A | 12/1988 | Raber et al. | |
| 4,794,398 A | 12/1988 | Raber et al. | |
| 5,001,650 A | 3/1991 | Francis et al. | |
| 5,552,705 A | 9/1996 | Keller et al. | |
| 6,243,036 B1 * | 6/2001 | Chadwick et al. | 342/27 |
| 6,359,582 B1 | 3/2002 | MacAleese et al. | |
| 6,480,141 B1 | 11/2002 | Toth et al. | |
| 6,504,479 B1 | 1/2003 | Lemons et al. | |
| 6,720,874 B2 | 4/2004 | Fufido et al. | |
| 6,720,905 B2 | 4/2004 | Levitan et al. | |

(Continued)

OTHER PUBLICATIONS

P. J.Phillips, "Personnel and Vehicular Monitoring and Tracking at a Distance", DARPA SBIR, Topic SB022-033, pp. 1-2, downloaded from http://www.zyn.com/sbir/sbres_/sbir/dod/darpa/darpasb02-2-033.htm on Jul. 2, 2002.

(Continued)

*Primary Examiner*—Thomas H Tarcza
*Assistant Examiner*—Peter M Bythrow
(74) *Attorney, Agent, or Firm*—Straub & Pokotylo; Michael P. Straub; Ronald P. Straub

(57) ABSTRACT

Methods and apparatus for early detection and identification of a threat such as individuals carrying hidden explosive materials, land mines on roads, etc. are disclosed. One method comprises illuminating a target with radiation at a first polarization, collecting first radiation reflected from the target which has the same polarization as the first polarization, illuminating a target with radiation at a second polarization, and collecting second radiation reflected from the target which has the same polarization as the second polarization. A threat determination is then made based on the difference between the energy values of the first and second collected radiations. In other embodiments, the difference between energy values is used in conjunction with an evaluation of the returned energy in comparison with returned energy from other targets in order to additionally assess whether the primary target is a threat.

16 Claims, 12 Drawing Sheets

U.S. PATENT DOCUMENTS

| | | | | |
|---|---|---|---|---|
| 6,731,845 | B1 | 5/2004 | Gerdt | |
| 6,967,612 | B1 * | 11/2005 | Gorman et al. | 342/22 |
| 2002/0067259 | A1 | 6/2002 | Fufidio et al. | |
| 2004/0041724 | A1 | 3/2004 | Levitan et al. | |
| 2004/0075738 | A1 | 4/2004 | Burke et al. | |
| 2004/0214598 | A1 * | 10/2004 | Parameswaran Rajamma | 455/556.1 |

OTHER PUBLICATIONS

D. Woolard and W. Clark, "Terahertz Interferometric Imaging Systems (TIIS) for Detection of Weapons and Explosives", Army SBIR, Topic A02-061, Army Research Office (ARO), pp. 1-3, downloaded from http://www.zyn.com/sbir/sbres/sbir/dod/army/armysb02-2-061.htm on Jul. 2, 2002.

K. Kappra, "Explosive Detection System", Army SBIR, Topic A02-037, Army Research Lab (ARL), pp. 1-3, downloaded from http://www.zyn.com/sbir/sbres/sbir/dod/army_/armysb02-2-037.htm on Jul. 2, 2002.

L. Malotky and S. Hyland, "Preventing Aircraft Bombings", The Bridge, v. 28, No. 3, pp. 1-6, Fall, 1998.

"Can Big Brother see right through your clothes? Beyond X-ray Vision", Discover, pp. 24-25, Jul. 2002.

Concealed Weapon Detection (Low Power Radars), AFRL/IF, pp. 1-2, downloaded from http://www.rl.af.mil/div/IFB/techtrans/datasheets/CWD-LPR.html on Aug. 13, 2002.

"Image processing tools for the enhancement of concealed weapon detection", Mohamed Adel Slamani, P.K. Varshney, R.M. Rao, M.G. Alford 1999. ICIP 99. IEEE Proceedings 1999 International Conference on Image Processing, Oct. 24-28, 1999, pp. 518-522 vol. 3.

"Remote concealed weapons and explosive detection on people using millimeter-wave holography", McMakin, D.L.; Sheen, D.M. Collins, H.D.; IEEE Security Technology, 1996. 30th Annual 1996 Int's Carnahan Conf., Oct. 2-4, 1996, pp. 19-25.

"Three dimensional millimeter-wave imaging for concealed weapon detection", D.M. Sheen, D.L. McMakin, T.E..; Hall, , IEEE Transactions on Microwave Theory and Techniques, vol. 49 Issue: 9 , Sep. 2001 pp. 1581-1592.

"Privacy Algorithm for Cylindrical Holographic Weapons Surveillance System", P.E. Keller; D.L McMakin; D.M. Sheen; A.D. McKinnon;.J.W. Summet, Proc. IEEE 33rd Annual 1999 Int'l Carnahan Conference on Security Technology, Oct. 5-7, 1999 pp. 177-181.

Outdoor passive millimetre wave security screening:. G.N. Sinclair; R.N. Anderton; R. Appleby; 2001 IEEE 35th International Carnahan Conference on Security Technology, Oct. 16-19, 2001, pp. 172-179.

Millimetre wave aviation security scanner:, Murphy, K.S.J.; Appleby, R.; Sinclair, G.; McClumpha, A.; Tatlock, K.; Doney, R.; Hutchenson, I.; Security Technology, 2002. Proceedings. 36th Annual 2002 Int'l Carnahan Conference on , Oct. 20-24 pp: 162-166.

"Millimeter Wave/Infrared Concealed Weapons Detector", Justnet, Justice Technology Information Network, Jun. 21, 2002, 1 Pg.

"A Research of Moving Targets Detection and Imaging by SAR", Runhong Pan; Gang Li; Xixing Zhu; IGARRS '97. 'Remote Sensing-A Scientific Vision for Sustainable Development', vol. 1, Aug. 3-8, 1997 pp. 498-500.

* cited by examiner 301 302 303

| Polarization Pair | Time | AZ | Target 1 | T 2 | T 3 | T 4 | T 5 | T 6 | T 7 | Target 8 |
|---|---|---|---|---|---|---|---|---|---|---|
| | | | | | | | | | | |
| HH | 1 to 10ms | - 8.1deg | R(1)1,1 A(1)1,1<br>[V(1)1,1 E(1)1,1]<br>…<br>R(1)1,10 A(1)1,10 | … | | | | | | R(1)8,1… |
| | | | | | | | | | | |
| HH | 11 to 20ms | - 6.3deg | R(2)1,1 A(2)1,1<br>[V(2)1,1 E(2)1,1]<br>…<br>R(2)1,10 A(2)1,10 | | | | | | | R(2)8,1<br>… |
| | | | | | | | | | | |
| HH | 21 to 30ms | - 4.5deg | ….. | | | | | | | |
| HH | 41 to 50ms | -0.9 | R(5)1,1 A(5)1,1<br>…. | | | | | | | |
| | | | | | | | | | | |
| HH | 91 to 100 | 8.1 | R(10)1,1 A(10)1,1<br>… | | | | | | | R(10)8,1<br>… |

Fig. 3

NO THREAT 601 602 603 604 605 606 607 608 609

611 612 613 614 615 616

| Scan/ Angle | Time | VV | HH | Target? | VV cum | HH cum | Cum VV/HH | Threat? |
|---|---|---|---|---|---|---|---|---|
| 1,1 | 10 | 1,200 | 1,000 | N | | | | |
| 1,2 | 20 | 32,300 | 8,800 | Y | 32,300 | 8,800 | 3.67 | N |
| 1,3 | 30 | 29,200 | 8,900 | Y | 61,500 | 17,700 | 3.47 | N |
| 1,4 | 40 | 36,100 | 9,200 | Y | 97,600 | 26,900 | 3.63 | N |
| 1,5 | 50 | 800 | 900 | N | | | | |
| 1,6 | 60 | 900 | 1,000 | N | | | | |
| 2,1 | 110 | 900 | 1,100 | N | | | | |
| 2,2 | 120 | 800 | 800 | N | | | | |
| 2,3 | 130 | 36,200 | 9,200 | Y | 133,800 | 36,100 | 3.71 | N |
| 2,4 | 140 | 34,700 | 8,700 | Y | 168,500 | 44,800 | 3.76 | N |
| 2,5 | 150 | 35,200 | 8,900 | Y | 203,700 | 53,700 | 3.79 | N |
| 2,6 | 160 | 1,100 | 1,000 | N | | | | |
| | | | | | | | | |

AMBIGUOUS 701 702 703 704 705 706 707 708 709

| Scan/ Angle | Time | VV | HH | Target? | VV cum | HH cum | Cum VV/HH | Threat? |
|---|---|---|---|---|---|---|---|---|
| 1,1 | 10 | 1,200 | 1,000 | N | | | | |
| 1,2 | 20 | 51,200 | 8,800 | Y | 51,200 | 8,800 | 5.82 | A |
| 1,3 | 30 | 50,200 | 8,900 | Y | 101,400 | 17,700 | 5.73 | A |
| 1,4 | 40 | 49,100 | 9,200 | Y | 150,500 | 26,900 | 5.59 | A |
| 1,5 | 50 | 800 | 900 | N | | | | |
| 1,6 | 60 | 900 | 1,000 | N | | | | |
| 2,1 | 110 | 900 | 1,100 | N | | | | |
| 2,2 | 120 | 800 | 800 | N | | | | |
| 2,3 | 130 | 50,200 | 9,200 | Y | 200,700 | 36,100 | 5.56 | A |
| 2,4 | 140 | 51,700 | 8,700 | Y | 252,400 | 44,800 | 5.63 | A |
| 2,5 | 150 | 50,200 | 8,900 | Y | 302,600 | 53,700 | 5.64 | A |
| 2,6 | 160 | 1,100 | 1,000 | N | | | | |
| | | | | | | | | |

THREAT 801 802 803 804 805 806 807 808 809

| Scan/ Angle | Time | VV | HH | Target? | VV cum | HH cum | Cum VV/HH | Threat? |
|---|---|---|---|---|---|---|---|---|
| 1,1 | 10 | 1,200 | 1,000 | N | | | | |
| 1,2 | 20 | 73,300 | 8,800 | Y | 73,300 | 8,800 | 8.33 | Y |
| 1,3 | 30 | 73,200 | 8,900 | Y | 146,500 | 17,700 | 8.28 | Y |
| 1,4 | 40 | 74,100 | 9,200 | Y | 220,600 | 26,900 | 8.20 | Y |
| 1,5 | 50 | 800 | 900 | N | | | | |
| 1,6 | 60 | 900 | 1,000 | N | | | | |
| 2,1 | 110 | 900 | 1,100 | N | | | | |
| 2,2 | 120 | 800 | 800 | N | | | | |
| 2,3 | 130 | 75,200 | 9,200 | Y | 295,800 | 36,100 | 8.19 | Y |
| 2,4 | 140 | 74,700 | 8,700 | Y | 370,500 | 44,800 | 8.27 | Y |
| 2,5 | 150 | 75,200 | 8,900 | Y | 445,700 | 53,700 | 8.30 | Y |
| 2,6 | 160 | 1,100 | 1,000 | N | | | | |
| | | | | | | | | |

811 812 813 814 815 816

METHODS AND APPARATUS FOR DETECTING THREATS USING RADAR

RELATED APPLICATIONS

The present application claims the benefit of U.S. Provisional Patent Application Ser. No. 60/798,885, filed on May 9, 2006, titled "SYSTEMS AND METHODS FOR THE DETECTION OF CARRIED AND "LEFT BEHIND" IMPROVISED EXPLOSIVE DEVICES", which is hereby expressly incorporated by reference.

FIELD OF THE INVENTION

The invention relates generally to the field of threat detection and, more specifically, to a system and method for identifying potential threats and displaying information indicating the position of the potential threats both indoors and outdoors.

BACKGROUND OF THE INVENTION

The suicide or homicide bomber has been identified as the one threat that is virtually unstoppable. The thinking of the bomber defies all societal norms. With that being said, the logical solution to the problem would be the development of a means for detecting the bomber at a safe distance from a potential target. To date, there are no known concealed weapons or explosive detection systems available that purport to detect a concealed weapon (or weapons) or explosive devices from a distance of more than 20 yards. Reference is made to an article in the July 2002 Discover Magazine entitled "Beyond X-ray Vision" by Ivan Amato for a recent survey of the current state of the technology. Attention is also called to an article in the fall 1998 The Bridge published by the National Academy of Sciences entitled "Preventing Aircraft Bombings" by Lyle Malotky and Sandra Hyland for additional background information on the problem to be solved.

Almost every known detection system is electromagnetic-based and requires an individual to pass through a fixed passageway. When metallic objects pass through the passageway, a warning signal is activated because a change in magnetic flux is detected. This type of system either detects or does not detect a metal object and makes no determination relative to the amount of metal present. Keys, jewelry, watches, and metal-framed eyeglasses may all trigger such a system.

U.S. Pat. No. 6,359,582 describes a weapons detector and method utilizing Radar in conjunction with stored spectral signatures. The system is said to be capable of measuring the self-resonant frequencies of weaponry. It is claimed that accuracies of greater than 98% can be obtained at distances, preferably between 4-15 yards. It is also claimed to be capable of detecting metal and non-metal weapons on a human body, in purses, briefcases and under clothing and discerning from objects such as belt buckles, coins, keys, calculators and cellular phones. This system has the disadvantage of relying on the presence of unique spectral signatures, which must be pre-stored or learned by a computer employing artificial intelligence techniques.

Another patent, U.S. Pat. No. 6,243,036, titled Signal Processing for Object Detection System describes another concealed weapon detection system. The patent describes detecting concealed weapons by transmitting a horizontally polarized signal, and receiving the reflected signal in two different polarizations (horizontal and vertical), and calculating the difference between levels of the different polarized reflected energy in the time domain, and by using signal processing methods and apparatus to improve the reliability of the detection process.

Public information indicates that Lockheed Martin, under contract to the Air Force Research Laboratories and the National Institute of Justice, is in the process of developing a dual-mode (millimeter wave/infrared) camera to detect weapons concealed on an individual. The information indicates that the system will operate at a range of 10 to 40 feet, without the control or cooperation of the individual under surveillance. The described system develops images from the returned Radar energy. The image information is processed using algorithms to automatically detect and recognize concealed weapons. The detection and position information from the Radar sensor would be linked to a second sensor IR or visual camera to display the subject to authorities.

In addition to the above described detection systems, there are several new initiatives being pursued under the auspices of the Small Business Innovation Research (SBIR) program in the Concealed Weapons Detection arena. The DARPA SBIR, Topic SB022-033 entitled Personnel and Vehicular Monitoring and Tracking at a Distance seeks to "develop 3D biometric technologies as part of a multi-modal system to detect, track and recognize humans . . . at a distance to support early warning, force protection, and operations against terrorist, criminal and other human based threats." The particular focus of this work is 3D imaging. The Army Research Office (ARO) SBIR Topic A02-061, Terahertz Interferometric Imaging Systems (TIIS) for Detection of Weapons and Explosives seeks to "develop and demonstrate a terahertz-frequency imaging array with sufficient spatial and spectral resolution to enable the rapid and effective detection of concealed weapons and explosives. The envisioned sensing system will provide real-time imaging with adequate sensitivity for the short-range remote interrogation of objects and persons that might be concealing either "weapons or explosives" with a parallel focus on collecting "signature information for a set of expected targets and concealment materials." The Army Research Lab (ARL) SBIR, Topic A02-037, Explosive Detection System, is focused on chemical signatures of explosives. Such development programs further highlight the need for improved concealed weapon detection systems. The Air Force SBIR, Topic AF03-123 entitled Hidden Threat Detection Techniques seeks to "capitalize on emerging non-contact nondestructive evaluation detection techniques as well as revolutionary concepts for sensors and detectors and tailor them to specific applications for personnel protection."

Current fielded concealed weapons and/or explosive detection devices operate at close range, typically less than 0.5 meter in portal, hand-wand or hand-held applications. The detection of concealed explosives or metallic and non-metallic weapons carried on persons under clothing in controlled environments, such as building entry (schools, government buildings) or transportation terminals, and uncontrolled environments, such as shopping malls or sporting events, at safe distances, typically in excess of 50 meters would be desirable.

Side-attack mines and improvised explosive devices (IEDs) that attack vehicles and personnel from the side as the target passes by are numerous and are a growing threat. An ability to detect devices that are concealed by camouflage or foliage at distances up to 200 meters with a high probability of detection, high clutter discrimination, and low false alarm rate at convoy rates of advance are desirable.

What is needed is the ability to:

Detect individuals wearing a modest quantity of hidden metal material in the form of pipes configured like an explosive device

- Detect individuals carrying a hidden rifle
- Distinguish armed individuals from the general population in less than one second
- Detect IEDs in camouflage
- Routinely make this assessment at ranges in the open on the order of 30 meters or more from the sensor
- Implement a low cost system concept from existing commercially available subsystems In view of the above discussion, it is apparent that there is a need for new or improved systems and methods for rapidly evaluating the threat potential of an individual amongst other individuals at a relatively long distance both indoors and outdoors, and the presence of roadside bombs. It is also desirable that the methods and/or apparatus provide an integrated, threat-driven solution to the threat detection problems discussed above.

SUMMARY OF THE INVENTION

The above needs are met by the present invention. The present invention is directed to concealed weapon/explosive detection including improvised explosive devices (IEDS) and, more specifically, to the data processing for a system and method that isolates and identifies potential concealed weapon carriers and IEDs with sufficient warning, both in time and distance, to permit successful defensive action to limit the loss of life and destruction of property. The invention is appropriate for use both indoors and out, is benign to people and property in the interrogated area, and has the potential to be portable.

An exemplary embodiment of a system consistent with the present invention uses two transmitted Radar signals at orthogonal polarizations to simultaneously pan an environment for potential targets, measures the difference between the Radar signal levels returned or reflected and exploits the difference between normal background areas and threat areas resulting from, e.g., the presence of weapons or other hardware, to present to an operator a visual representation of the examined area with potential threats highlighted using visual markers such as distinctive coloring, particular shapes, or other visual indicia of information, e.g., a potential threat, associated with the different areas which are examined.

The method and apparatus of the present invention can be mounted on mobile devices or positioned at fixed locations. The mobile mounted embodiments can be used by trucks and/or other vehicles to identify possible roadside threats or threats which may exist in the vehicle's direction of travel. Such threats include, e.g., above ground mines, improvised explosive devices and/or other types of weapons.

In cases where hidden weapons on individuals is the primary concern, the display may limit the visual display of information to areas, e.g., cells of a scanned region, where a human presence is detected, e.g., through the use of thermal or other information. Such an embodiment reduces clutter on the display and helps a user focus on potential threats.

One embodiment of the present invention focuses on active millimeter wave (MMW) Radar to detect explosives and weapons because Radars at this frequency have several advantages. First, some of the components found in hidden explosives have dimensions comparable to the wavelength of the Radar. In theory, this fact indicates that any conductive components will be significant reflectors of electromagnetic (EM) energy. Second, the explosive component has a significant dielectric constant that will alter the EM field making it more likely to be detectable by this Radar. Other wavelengths of Radar could also provide valuable algorithm inputs.

One embodiment of the present invention uses a Frequency Modulation/Continuous Wave (FM/CW) waveform alone. However, another embodiment recognized by those skilled in the art, would be the utilization of other waveforms, such as Pulse Doppler or Frequency Shift Keying (FSK). Second, another embodiment could utilize several waveforms transmitted simultaneously or near simultaneously that would take advantage of the differences in the way the waveform interacts with the target to provide additional independent assessments of the threat potential of a given detected target.

One embodiment of the active millimeter multiple polarization threat detection system consistent with the present invention transmits and receives Radar signals of both horizontal and vertical polarizations.

- The population dependent relationship between the two independent data sets gathered on each target and the corresponding data sets on the average of all targets (or historic values of such targets) yields a threat assessment that only requires a small number of innocent targets to establish the initial thresholds for the deployment and no other calibration was previously disclosed in the prior art for a single polarization. In this embodiment we examine two orthogonal polarizations, VV and HH with the same objective. Each such ratio of the individual being examined relative to the average values of the population being examined provides an assessment. For example, the VV value of a target with a vertical cylindrical weapon would be higher than the VV value for the average of all persons with no such weapon. If the orientation of the weapon were horizontal the HH value of the target with the weapon would be higher than the HH value for the average of all persons with no such weapon. Since it is not possible, a priori, to know the orientation of a concealed weapon, both relationships are evaluated and provide input to the total threat assessment algorithm.
- The population independent relationship between the two independent polarization specific data sets (horizontal polarization on transmit and receive (HH), and vertical polarization on transmit and receive (VV)) gathered on each target yield a threat assessment indicator that does not rely on data about other targets nor system calibration. This threat assessment takes the form of a band, below which there is a high probability that the target is not a threat, and above which there is a high probability that the target is a threat. Since it is not possible, a priori, to know the orientation of a concealed weapon, we examine the absolute values of the ratios $|VV/HH|$ plus $|HH/VV|$. Ideally, one would measure this ratio in the field, to determine what the sum of the ratios would be for the specific conditions at that time for "normal" (non-threat) targets. This would establish a baseline sum (2, 3, 4, etc.) If there is no concealed explosive or weapon, or the orientation of the explosives is random, i.e., neither more vertical nor more horizontal, the ratio summation of $|VV/HH|$ plus $|HH/VV|$ will approximate the baseline. If there is a concealed explosive or weapon that has a dominant orientation of vertical or horizontal, the ratio summation of $|VV/HH|$ plus $|HH/VV|$ will be greater than the baseline amount. It is also possible that a target with some amount of horizontally disposed weaponry could result in a ratio sum between 2 and the established "normal" baseline, which also might be indicative of a threat.
- As a vehicle for threat declaration, the "population independent" (orthogonal polarization) approach can be utilized independently for threat detection. However, the combination of these two families of assessments (target independent and target dependent) provides a higher probability of threat detection and a lower probability of false alarm than either one by itself.

The algorithms that are crucial to rapidly evaluating the threat potential of an individual amongst other individuals at a relatively long distance and the existence of above surface IEDs rely on the availability of orthogonally polarized target information and/or a multiplicity of Radar waveforms and/or a multiplicity of radar wavelengths. The systems or methods are capable of being implemented without the need for complex signal processing, thereby reducing implementation costs relative to many of the known systems. The methods and/or apparatus provide an integrated, threat-driven solution to the threat detection problems discussed above.

Based upon the dual polarized Radar, the present invention can distinguish a homicide bomber outfitted with an explosive vest from an average innocent individual, can distinguish an individual carrying a hidden weapon from an average innocent individual, and can distinguish IEDs from the background environment. From a straight detection standpoint, the noise-like returns from objects, like foliage, add incoherently to each other from scan to scan, whereas the return from man-made objects or hard targets add coherently. The summation of the scans is the integration process whereby returns from the individual will separate from the background at the same range. In one embodiment that addresses both the homicide bomber detection problem and the IED detection problem, a multi-stage method can be employed, which advantageously utilizes the relationship between the peak returns per scan over the target or the peak returns from a dwelling on a target and the summation of all returns per scan over the target or the summation of all returns from a dwelling on a target, obtained from the transmission and reception of different polarizations as one "vote" (population independent) and the relationship between the returns from the individual or object in question and the average of returns from other individuals or objects and/or background interrogated during that deployment session provides another "vote" (population dependent). The measured data that contributes to each vote passes a threshold test in order to make a threat declaration.

Utilization of both multiple polarizations and multiple waveforms, where economically feasible, will further enhance the performance of the system. The simultaneous or near simultaneous raw data at multiple polarizations transmitted simultaneously or from pulse to pulse and multiple waveforms produce a time driven, multi-dimensional processing chain of events leading to a threat declaration that has a high probability of detection and a low probability of false alarm.

The implementation of multiple, near simultaneous waveforms illuminating the same target will also enhance the probability of detection, decrease the probability of false alarms, and reduce the incidence of being unable to make a determination. Different waveforms provide a basis for improved signal to noise ratio depending on the motion of the target, the environment in which the threat is located and the configuration of the weapons/explosives. In one embodiment, simultaneous or near simultaneous FMCW and Pulse Doppler waveforms are transmitted. Those skilled in the art understand that other waveform combinations could be selected without departing from the spirit and scope of the invention.

Numerous additional features, embodiments and benefits of the methods and apparatus of the present invention are discussed below in the detailed description which follows.

BRIEF DESCRIPTION OF THE DRAWINGS

FIG. 3 illustrates a data file used to implement an embodiment of the present invention.

FIG. 6 illustrates a table of received reflected signals of varying polarity which are utilized to determine whether the target is a threat.

FIG. 7 illustrates a table of received reflected signals of varying polarity which are utilized to determine whether the target is a threat.

FIG. 8 illustrates a table of received reflected signals of varying polarity which are utilized to determine whether the target is a threat.

DETAILED DESCRIPTION

Figure 1:
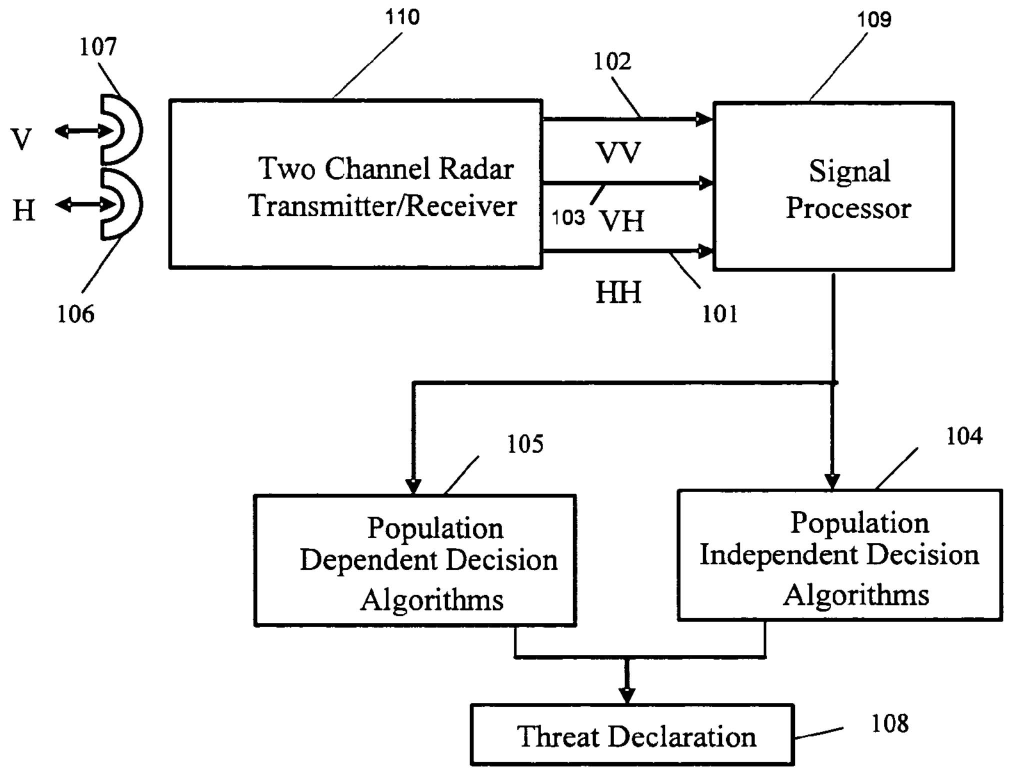
FIG. 1 illustrates an exemplary system and various signals passed between the system components in accordance with the present invention.

In one embodiment of the present invention, a family of threat declaration methods and systems identifies targets which are threats, independent of analyses of other targets, dependent on analysis of other targets and/or both in concert. It accomplishes this by addressing the relationship between two independent data sets gathered and analyzed individually on each target. The two independent data sets consist of data obtained by transmission of a Radar signal on a vertical polarization and receiving reflected returns on a vertical polarization (VV) and the simultaneous transmission of a Radar signal on a horizontal polarization and receiving a portion of the reflected horizontally polarized return (HH).

Combining the data from several scans over the target will increase the probability of detection while reducing the probability of false alarm. For conventional Radar systems, criteria have been developed to evaluate system performance depending on signal to noise ratio. These criteria ensure the detection of the target but do not provide its threat status. In a threat detection system, an evaluation must be made as to whether or not the detected target constitutes a threat. This is advantageously accomplished by setting the threat detection threshold dynamically in the field during each deployment based on measured target polarization returns (integrating the values over time) of all observed targets, most of whom are without explosives. The longer the integration time, the better the performance that can be achieved.

It is the relationship of the levels in all the target associated cells (each individual Radar return making up the sum total of returns associated with that particular target) to the average level of all other target associated cell returns that determines the presence of a threat on the one hand (target dependent) and the |VV/HH| and |HH/VV| ratios, which are independent of other targets in the scene, on the other. The summations and averaging discussed above in relation to the "dependent" family of threat declaration methods and systems are extensions of the basic methods and systems disclosed in the prior referenced patents (U.S. Pat. Nos. 6,720,905 B2 and 6,856,272 B2 incorporated herein by reference), which generally concentrate purely on relative levels of the peak values.

The dual polarization of transmitted signals using vertical polarization on transmit and vertical polarization on receive and using horizontal polarization on transmit and horizontal polarization on receive (and in some cases using vertical transmission and horizontal reception and/or horizontal transmission and vertical reception) is constructed in real time in order to create a database which is used in both the "independent" and "dependent" families of threat declaration methodologies and systems described generally above, and in detail below.

While a sensor operated at 76.5 GHz, transmitting and receiving on both horizontal and vertical polarization and using FM-CW modulation is advantageous, those skilled in the art will recognize that the operating frequency could be replaced by other frequencies, the polarization could be right and left circular or any combination of orthogonal polarization senses and the waveform could be FM-CW modulation, pulse Doppler, FSK or other waveforms, either alone or in concert.

The determination of whether an individual is a threat or not can be accomplished in a typical instance of a person (target) wearing a bomber vest (threat) by recognizing the following. The bomber vest is typically composed primarily of cylinders consisting of metallic pipes and/or high dielectric material shaped in the form of cylinders. While these cylinders are generally placed vertically around the torso of the suicide bomber, the application of the multi vote process eliminates the orientation of the explosives as a factor in the final assessment.

By way of example, this arrangement of vertical cylinders, yields larger returns (Radar signal reflections), in this instance VV, than the other co-polarization pair, in this instance HH. In this instance, the ratio of |VV/HH| for the target with a bomber vest will be significantly larger than the ratio for a target who is not a threat (not carrying a hidden weapon). This difference in |VV/HH| ratios is then utilized to identify a target who is a threat. It should be noted that this ratio is independent of the returns from other targets and non-targets within the Radar scanning area (scene).

Other threats hidden on a human body, such as a rifle, will also yield a similar larger ratio of |VV/HH| or |HH/VV| depending on the orientation of the threat, than for a target who is not a threat. Also, since IED's are typically made of cylindrical components, simultaneous Radar signals of orthogonally opposed polarizations will yield a significantly greater ratio of returns from one polarization over returns of another polarization than the ratios of similar returns from objects which are not IED's. Threats that do not have longitudinal symmetry (randomly aligned materials vs. cylinders and rectangular solids) are addressed by the "dependent" threat test.

For a different bomb surrogate configuration, HH could be larger than VV. Thus, it should be recognized that differences between the returns corresponding to different transmitted signal polarizations, e.g., horizontal and vertical, could be used in detecting a threat.

In some embodiments of the present invention, threat detection can therefore be based on the ratio of returns corresponding to different polarizations, using, e.g., $$R=|(VV/HH)|+|(HH/VV)|$$

where a threat may be declared present when R exceeds a first threshold (experimentally determined to be some amount above 2) indicating a significant difference between vertical and horizontal signal components. The threshold may be predetermined or dynamically determined. The values input to the R calculation are obtained from the target peak signal return and summation of returns within the azimuth and range expanse of the target as a function of polarization of each target. Thus, several calculations of the ratio are made, e.g.:

$$R_{peak}=(VV_{peak}/HH_{peak})|+|(HH_{peak}/VV_{peak})| \text{ and}$$

$$R_{summation}=(VV_{summation}/HH_{summation})|+|(HH_{summation}/VV_{summation})|$$

per dwell or scan over the target as well as $$R_{cumulative\ summation}=|(VV_{cumulative\ summation}/HH_{cumulative\ summation})|+|(HH_{cumulative\ summation}/VV_{cumulative\ summation})|$$

and each provides a vote as to the threat status of the detected target. $R_{peak}$ is constantly replaced by subsequent measures if that measure is greater and $R_{summation}$ is constantly updated and becomes $R_{cumulative\ summation}$ after the initial scan over or the dwell on the target.

Additionally, certain threats may have unique attributes of changing the polarization of a reflected signal from the transmitted signal. In such a case, these threats may be detected in whole or in part by factoring into the detection process the relative amount of horizontal returns from a vertically polarized transmitted signal, and/or the vertically polarized returns reflected back by a target which has been illuminated by a horizontally polarized signal.

Advantageously, a threshold band can be defined above R=X (where X is 2 or some baseline value above 2) and below R=Y (where Y is a value above X). Below this band there is a high probability that the target is not a threat, and above this band there is a high probability that the target is a threat. Results within this band may indicate a possible threat. The values of X and Y may advantageously be determined empirically by evaluation of experimental or "on-scene" results.

In another embodiment of the present invention, the above-described family of threat declaration systems which are independent of other targets' returns can and should be augmented by additionally performing threat declaration methods which are dependent on the returns (either real-time, historic, or both) of other targets in the Radar scanned scene to deal with random orientations of explosive materials. Applying both families of threat declaration methods or systems to gathered data will yield a higher probability of threat detection and a lower probability of false alarm than for either family implemented individually.

This second family of dependent threat detection methodologies comprises the broader set of conclusions relative to the expected returns from someone wearing concealed explosives and/or carrying a concealed weapon versus the rest of the population at or before the time of current measurement. For this set of methodologies, one can Compare the target peak signal return and summation of returns within the azimuth and range expanse of the target as a function of polarization of each target to the corresponding range attenuation adjusted value for the average of all targets in the scanned scene, and Compare each target's determined values to its corresponding threshold (based on average returns from targets within the scene, or to average targets historically) to maximize probability of detection while minimizing false alarms.

In the embodiment shown in FIG. 1, two antennas 106, 107 are mounted one above the other and connected to independent receivers in the two channel Radar transmitter/receiver (transceiver) 110. Transceiver 110 is a homodyne type in which a linearized sweep of the transmitter oscillator is sampled, sent to signal processor 109 over VV link 102 and HH link 101, and mixed with the target return to generate an IF frequency representing twice the range to the target in signal processor 109. The two IF analog frequencies are digitized, processed in FFT, and used by the operating code to generate target information. Data from multiple scans or dwells on a target for each polarization pair and waveform is fused into a set of features about each detected target.

Data from the scans is transferred to population dependent decision algorithms 105 and population independent decision algorithms 104. For example, VV data could be sent to population dependent decision algorithms 105 to be compared with a threshold signal strength for threats (based on average or typical returns from non-threat targets). This would result in a "vote" for the target to either be declared a threat or not, and the vote forwarded to threat declaration 108. Simultaneously, VV and HH data may be sent to population independent decision algorithms 104, where the ratio of VV/HH and |HH/VV| is computed for the returns from a particular target. If this ratio yields a result above a pre-determined threshold indicative of a threat, a "threat vote" is declared and forwarded to threat declaration 108. Threat declaration 108 would combine the two votes, and declare a threat if, for instance, both votes indicated a threat. Alternatively, a threat could be declared if either vote indicated a threat. Another possibility would be to declare a "possible threat" if the votes are not the same.

It is possible that particular threats could manifest themselves by reflecting a polarization orthogonal to the transmitted polarization. In such a case, VH (transmitted with vertical polarization and received with horizontal polarization) data 103 could be sent from a receive only Radar receiver 110 to signal processor 109, and this additional data could be processed in population independent decision algorithms 104 to either modify its "threat" vote, or to provide an additional vote, to threat declaration 108.

Further, it may be advantageous for signal processor 109 to identify the average detected signals at each polarization, and the peak detected signals at each polarization, and additional threat assessments could be made based on these inputs. For example, while the cumulative |VV/HH| plus |HH/VV| might not be indicative of a threat, the peak of these ratios for a given Radar sweep of the target might result in an indication of a threat.

Figure 2:
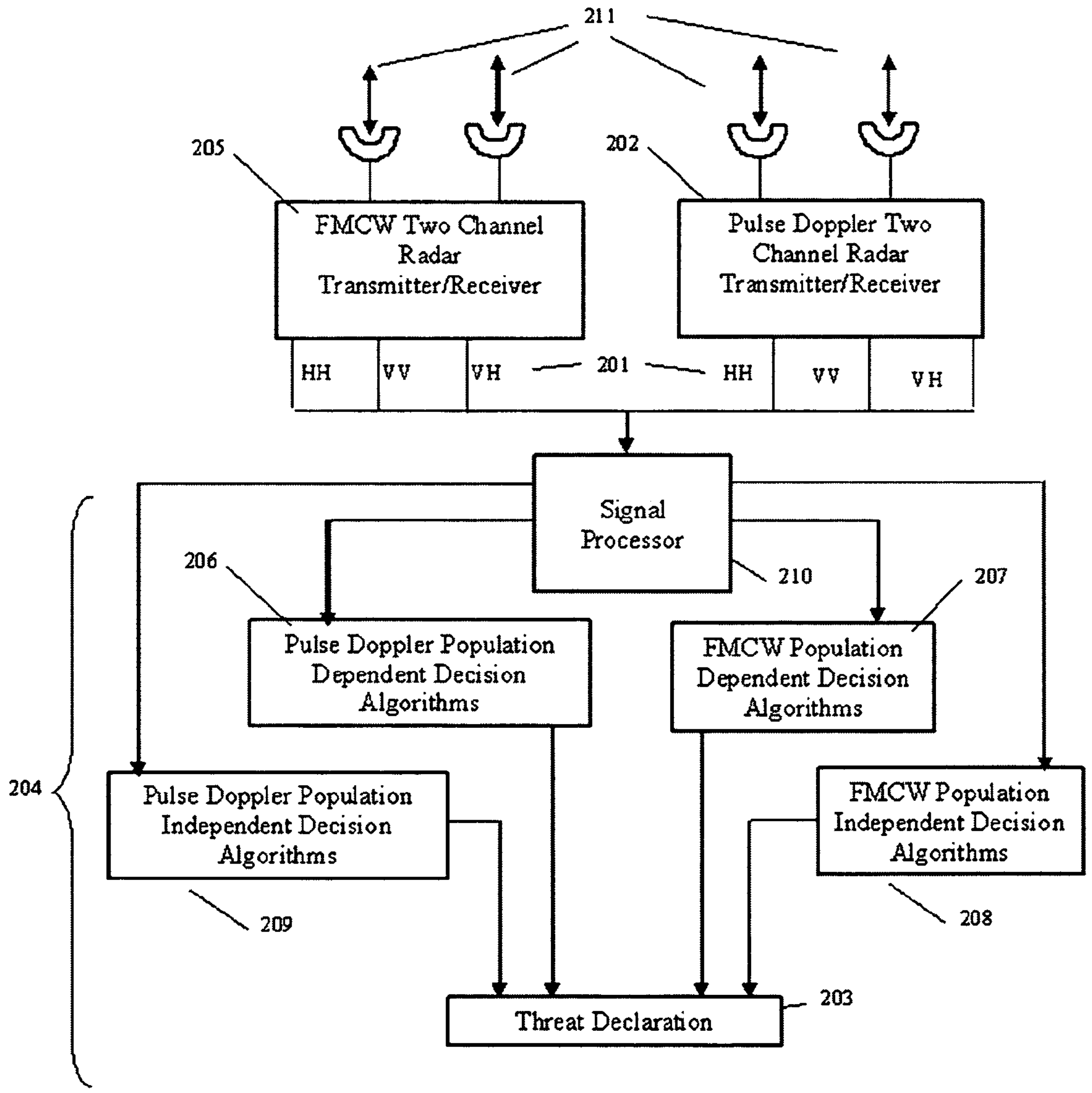
FIG. 2 illustrates an exemplary system and various signals passed between the system components in accordance with the present invention.

FIG. 2 illustrates an alternative embodiment of the present invention. In this case, there are two transceivers, each transmitting and receiving on vertical and horizontal polarizations (using antennas 211). FMCW Two Channel Radar Transmitter/Receiver 205 utilizes FMCW signals, and Pulse Doppler Two Channel Radar Transmitter/Receiver 202 utilizes Pulse Doppler Radar signals. The resultant vertical and horizontal reflected signals 201 are passed to signal processor 210. Data from these scans is transferred from signal processor 210 to Pulse Doppler Population Dependent Algorithms 206, Pulse Doppler Population Independent Decision Algorithms 208, FMCW Population Dependent Decision Algorithms 207, and FMCW Population Independent Decision Algorithms 209. These algorithm processors 204 transmit their threat "votes" to Threat Declaration 203, which processes the various threat determinations (votes) into an overall threat assessment (i.e., Threat, No Threat, or Ambiguous or Uncertain).

By utilizing two different Radar transmission systems (FMCW and Pulse Doppler), threats which may have been missed by either system individually (due to the complexities in the way a particular waveform is reflected by a target, for example), may be advantageously identified by the combination system of FIG. 2.

FIG. 3 illustrates a data file of Radar returns consistent with the present invention. The Radar systems feed FFT sampled data for each polarization/waveform pair for subsequent analysis by the threat determination/declaration algorithms. The raw data is in the form of a tabulated list consisting of polarization pair (e.g., vertical/vertical and vertical/horizontal) 301, scan number (time) 302, and {range, azimuth, elevation, velocity and signal amplitude} 303. This data is compiled for each target within the Radar scanned scene. This data file is then used to perform the Population Independent and Population Dependent threat determination evaluations.

Figure 4:
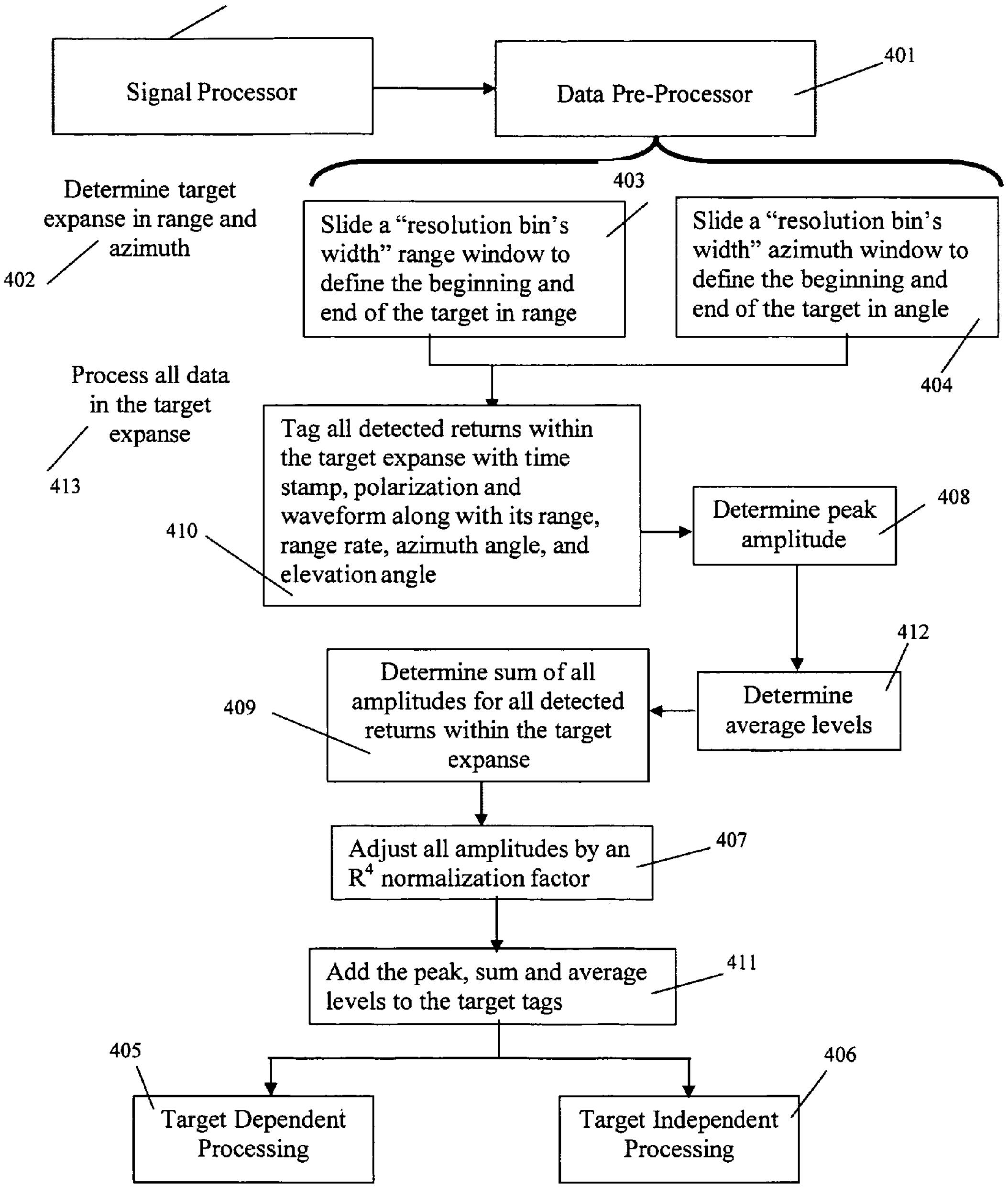
FIG. 4 illustrates a flowchart of operations consistent with the present invention.

FIG. 4 illustrates an advantageous process for performing threat determination evaluations consistent with some embodiments of the present invention. This process involves receiving inputs from transceivers of orthogonal polarizations (such as horizontal and vertical) illuminating the same target scene. The received inputs are used to compute a "vote" regarding the determination of a threat using Population Independent evaluations, such as by taking the ratio of vertical polarized returns over horizontal polarized returns, and voting for the existence of a threat based on this ratio. Simultaneously, using the same inputs, a second "vote" regarding the determination of a threat using Population Dependent evaluations, such as by comparing the target's returns (or the average target returns, or the peak target returns, or the cumulative target returns, for example) with the returns for other targets in the scanned scene, or with historic "non-threat" target returns. These "votes" are then utilized to calculate an overall threat assessment (discussed in relation to FIG. 8).

In order to effectively accomplish the threat declaration, target extent and target centroid processing schemes need to be determined. This is accomplished in the Data Pre-Processing 401 stage, which receives signal data from Signal Processor 420. The total, target caused Radar return is made up of a plurality of range-azimuth cell Radar returns 402 resulting from a multiplicity of transmitted pulses. A sliding window in range 403 and angle 404 allows the accumulation of all the amplitudes in all the range-azimuth cells associated with each target. The range-azimuth cell Radar returns must be pre-processed to prepare them for the data assessment algorithm 413. Since the system utilizes multiple polarizations, the data from both channels needs to be associated with each target and conclusions drawn from the differences. Scan by scan data needs to be associated for each target, also, to deal with issues of target track continuity, masking and unmasking, and orientation.

In one embodiment of the present invention, both the scene-averaging algorithm (target dependent) 405 and the polarization ratios algorithm (target independent) 406 are implemented. This is accomplished by measurement of the level of all the pulses transmitted and received in all the populated cells associated with each target for each scan over the scene by each independent Radar at its corresponding polarization. This advantageously yields a dynamic determination of the range adjusted 407 peak 408 and summation of levels returned from all the target-associated cells 409 in the scene at both polarizations. The average level 412 is also computed. All detected returns within the target expanse are tagged with a time stamp, polarization and waveform along with its range, range rate, azimuth angle and elevation angle 410. Once the peak level, average level and sum of levels are obtained, this information is added to the tag for each target 411.

Figure 5:
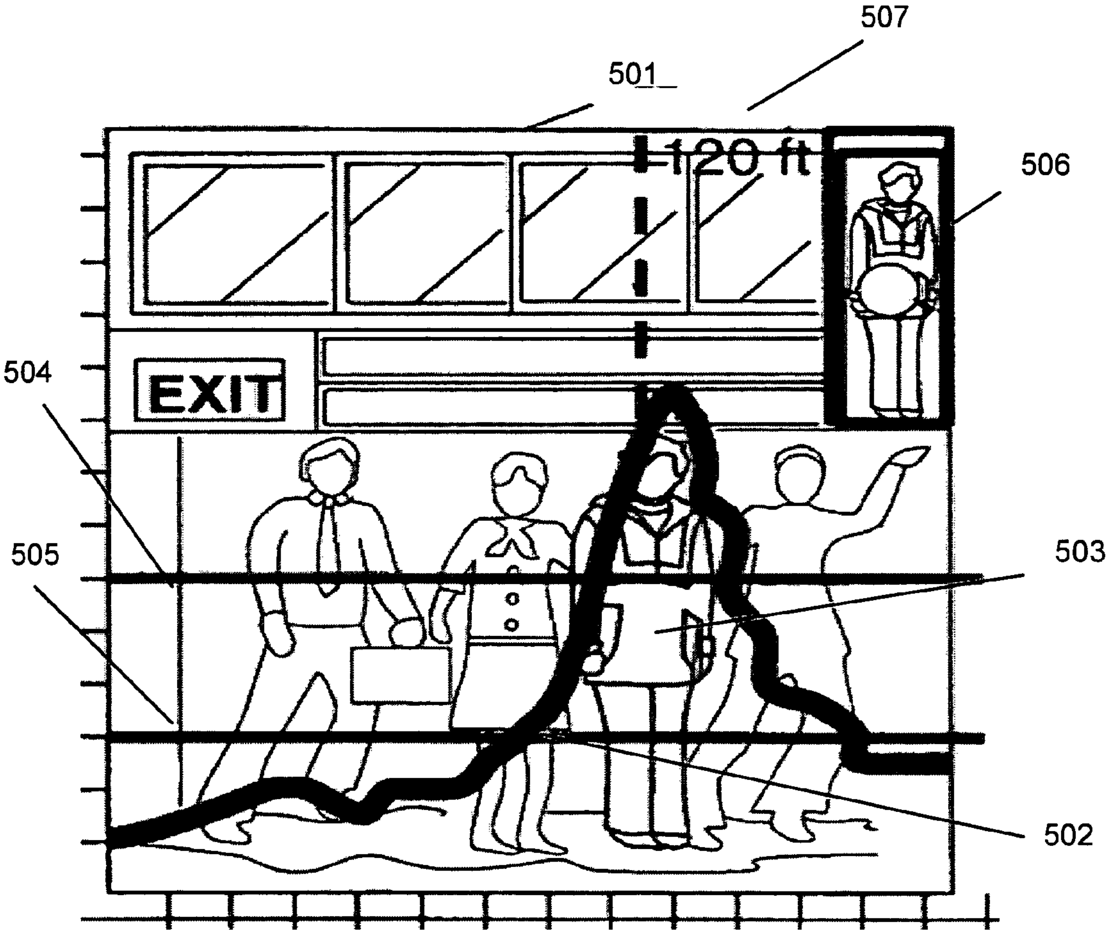
FIG. 5 illustrates the appearance of the image display on the monitor during the target acquisition process including superimposing reflected signal strength, which above a certain identified threshold level identifies a target to be evaluated further to identify if the target is a threat.

FIG. 5 shows the returns that would be identified as relating to a specific target 503. When the nominal range to a target is measured to be 120 feet at range 507, the amplitude of all the returns from the range expanse of the target that occur from both small errors in the range measurement and because of the finite range expanse of the target and the amplitude of the return (scanning from left to right) reaches a predetermined threshold indicative of the beginning of a target (the leftmost edge of target 503), such as the return signal 502 reaching threshold 505, subsequent scan returns are marked as being from target 503, until the signal level 502 drops below threshold 505 on the rightmost edge of target 503, signifying the final return from target 503 for that Radar scan. Returning to FIG. 4, this is operation 402, to determine target expanse in range and azimuth.

As described above, operation 407 adjusts all amplitudes by a normalization factor, such as for signal attenuation due to the range (distance) from the transmitter to the target (here, 120 feet). In this way, amplitude figures for the target can be compared with amplitude figures for other targets (in the present scene or from historic data) at varying distances from the transmitter.

FIG. 5 depicts a scanned scene as it would appear on a visual monitor 501, with the returns 502 of a specific target 503 (and also shown individually as an inset 506 on monitor 501), with the range 507 superimposed on the monitor, as well as threshold 505, which would indicate a signal amplitude indicative of a target, and threshold 504, which may be indicative of the amplitude of a threat, for reference in a target dependent threat analysis.

FIGS. 6, 7, and 8 show hypothetical examples of vertical and horizontal polarized signal return data for a selected target, along with an indication of the threat determination based on a target independent threat analysis. Each scan (from right to left) of each transmitter (one for each polarization) in each example takes 100 msecs. The "resolution bin width" for each example is 10 msecs. For the first scan (scan 1), for the first 10 msecs., the transmitter angle is "1", as seen in columns 601 and 602, row 611 of FIG. 6, and in columns 701, 702, 801, 802, and rows 711 and 811 of FIGS. 7 and 8, respectively. The amplitude 603 of the vertically polarized return is 1,200, and the horizontal return amplitude 604 is 1,000. Assuming that a target would have a return amplitude of at least 6,000, the determination 605 is that there is no target in this portion of the Radar scanned scene.

At angle 2 of scan 1 (column 601, row 612), the vertical return 603 is 32,300 and the horizontal return 604 is 8,800. Since both are above the threshold of a target (6,000), determination 605 is that this portion of the scene contains a target. The horizontal and vertical polarized returns are then accumulated in columns 607 and 606, respectively. A cumulative |VV/HH|+|HH/VV| 608 factor is computed at 3.94 for the target at this point in time. Assuming a historical determination that a |VV/HH| ratio of less than 4.5 is not a threat, and a |VV/HH| ratio of more than 7.0 is a threat, threat determination 609 is set at "N" for "no threat.

At angles 3 and 4 of scan 1 the returns are still indicative of a target, so these values are accumulated in columns 606 and 607, and the cumulative |VV/HH| calculations of column 608 are still below 4.5, so threat determination 609 continues to indicate "no threat".

At angle 5 of scan 1 (row 613), the VV and HH values drop below the target threshold of 6,000, and therefore target determination 605 indicates that this portion of the scanned scene does not include a target. Therefore, the associated returns for this area are not accumulated in columns 606 and 607 for the identified target.

For angle 1 of the second sweep (scan) of the scene (row 614), the return levels 603 and 604 are below the threshold of a target (6,000), and therefore these returns are not accumulated in columns 606 and 607. The same is true for angle 2 of scan 2 (the target has moved out of the angle 2 portion of the scanned scene since the first scan).

At angle 3 of scan 2 (row 615), both vertical 603 and horizontal 604 returns (36,200 and 9,200 respectively) exceed the historic threshold for a target return (6,000), and therefore target indicator 605 indicates a "Y" for the existence of a target, the vertical polarized return of 36,200 is added to the accumulated return of vertical polarized returns for this target in the first "sweep" of 97,600, yielding a new cumulative magnitude of 133,800 (column 606). The new horizontal polarized return cumulative value is 36,100 (column 607), and the newly computed cumulative |VV/HH| is 3.98, which is still below the lower end of the predetermined threat band of 4.5 to 7.0, and therefore threat determination 609 continues to indicate "no threat".

The target is still present at angles 4 and 5 of scan 2, and these signal return amplitudes (columns 603 and 604) are added to the cumulative totals of columns 606 and 607. The resultant cumulative |VV/HH| ratios are 4.03 and 4.06, respectively, and therefore threat determination 609 continues to be "no threat". At angle δ of scan 2 (row 616), the target is no longer present, as indicated by the values in columns 603 and 604.

FIG. 7 is a data file similar to that of FIG. 6, except that the VV returns 703 and VV cum 706 are larger when a target is present (rows 712 and 715) but similar to FIG. 6 when there is no target present (rows 713, 714, and 716). The HH returns 704 and HH cum 707, and target determination 705 are the same as FIG. 6. This results in larger cumulative |VV/HH|+|HH/VV| ratios 708. Since the ratios are greater than 4.5, but less than 7.0, they are within the "band" of predetermined possible threats (ratios in this range were judged to possibly indicate a weapon or explosive on a target). Threat determinations 709 are therefore "A" for "ambiguous". These targets would require additional time on target, inspection or analysis to determine if they were indeed threats.

FIG. 8 is a data file similar to that of FIGS. 6 and 7, except that the VV returns (column 803 and rows 812 and 815) and VV cum 806 returns are higher than for either FIG. 6 or FIG. 7, but similar to FIGS. 6 and 7 when there is no target present (rows 813, 814, and 816). The HH returns 804 and HH cum 807, and target determination 805 are the same as FIGS. 6 and 7. These returns result in cumulative |VV/HH|+|HH/VV| ratios 808 in excess of 8.0. Since these ratios are above the upper limit of the 4.5 to 7.0 threat band, threat determination 809 classifies these returns as threats ("Y"). This would result in a "yes" vote for the target independent family of threat determinations for this target.

Alternatively, as described previously, an additional threat "vote" could be based on a |VV/HH+HH/VV| ratio of the peak VV value (for instance, the 75,200 amplitude of row 815, column 803 is made up of 100's of individual amplitudes, each attributable to a transmitted pulse during the individual time period 802 wherein an exemplary peak amplitude could be 1,400) to the peak HH value within that scan sweep (scan 2), (in this instance, for the summation of the individual amplitudes 9,200 of row 815, column 804 an exemplary peak amplitude could be 120.) In some instances, this ratio might indicate a threat, whereas the cumulative |VV/HH|+|HH/VV| ratio might not indicate a threat.

Turning to the target dependent family of threat determinations, the same data of FIGS. 6, 7, and 8 can be utilized. For example, in FIG. 8, the VV levels of column 803 can be compared to the average VV levels over the entire scene (normalized for range distances). These latter targets are likely non-threatening, and would illustratively average about 35,000 per "resolution bin width". As the present target's VV values from FIG. 8 are approximately double the average value of the other targets in the scene (or of historical target values from the scene in previous scans), the "vote" from this analysis would also be "Yes", indicating a threat.

The "Yes" indication from the target independent determination, combined with the "Yes" vote from the target dependent determination would strongly indicate that the target was a threat, and the combined threat determination would be "Yes".

Alternatively, if one of the votes was "Yes" and one "No", the overall threat assessment would be "ambiguous", indicating a possible threat. If both votes were "No", the combined threat determination would be a strong "No". In any event, a final threat determination of "Yes" or "No" would be more reliable than either target independent or target dependent determinations individually.

Generally, since the data are generated over time, for a selectable (variable) range-(variable) azimuth bin, the time ordered summation of the data for each scan and each direction is generated. The process adds to the summation over time, keeping track of the value at each time interval and the summed value at each time value. Every time the scan and direction state changes (for purposes of discussion, every 100 msec), the sum is computed for that condition. This summed data is averaged over time and number of data points to feed into the threat declaration algorithm sequence. The number of contributors to each summation and the average level is computed and also feeds the threat declaration algorithm.

Figure 9:
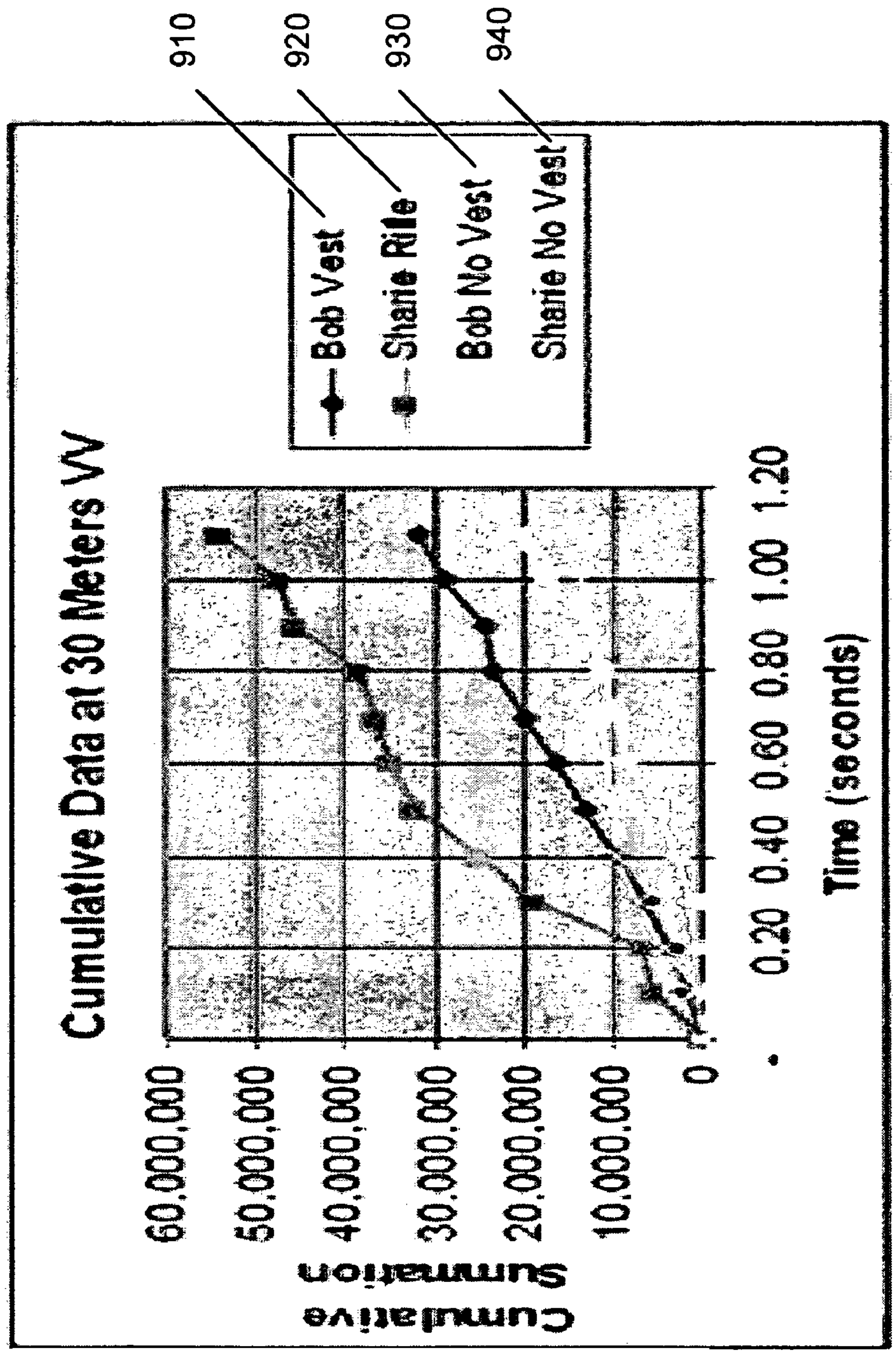
FIG. 9 illustrates actual data representative of targets which are threats and non-threats, with their associated detected reflected energy levels.

As an example of a threat determination process, based on the data shown in FIG. 9, returns from "threat" individuals (Bob Vest 910 and Sharie Rifle 920) and "non-threat" individuals (Bob No Vest 930 and Sharie No Vest 940) are plotted as a function of integration time. Probability of Correct Designation, $P_{cd}$, and Probability of False Designation, $P_{fd}$, are derived. The rationale for declaring accomplishment of a $P_{cd}$ and $P_{fd}$ is explained by this example data. At each integration time increment and at a specific threshold setting, e.g., a threshold which may be predetermined, derived experimentally, or dynamically determined depending on the embodiment, a determination is made as to which Radar returns exceed the threshold setting. In this exemplary analysis a determination was made as to how long it would take for all threat individuals to exceed the threshold and no non-threat individuals to exceed the threshold setting. At that point, the probability of correct designation is 100 percent. Similarly, analysis determined how long it would take for a non-threat individual to exceed the threshold. The integration time has to be set shorter than that time for the probability of false designation to be zero. For this exemplary evaluation, for targets at 30 meters and for an empirical threshold setting of 12,000,000 and an integration time of 0.6 seconds, $P_{cd}$ approaches 100 percent with no $P_{fd}$.

Figure 10:
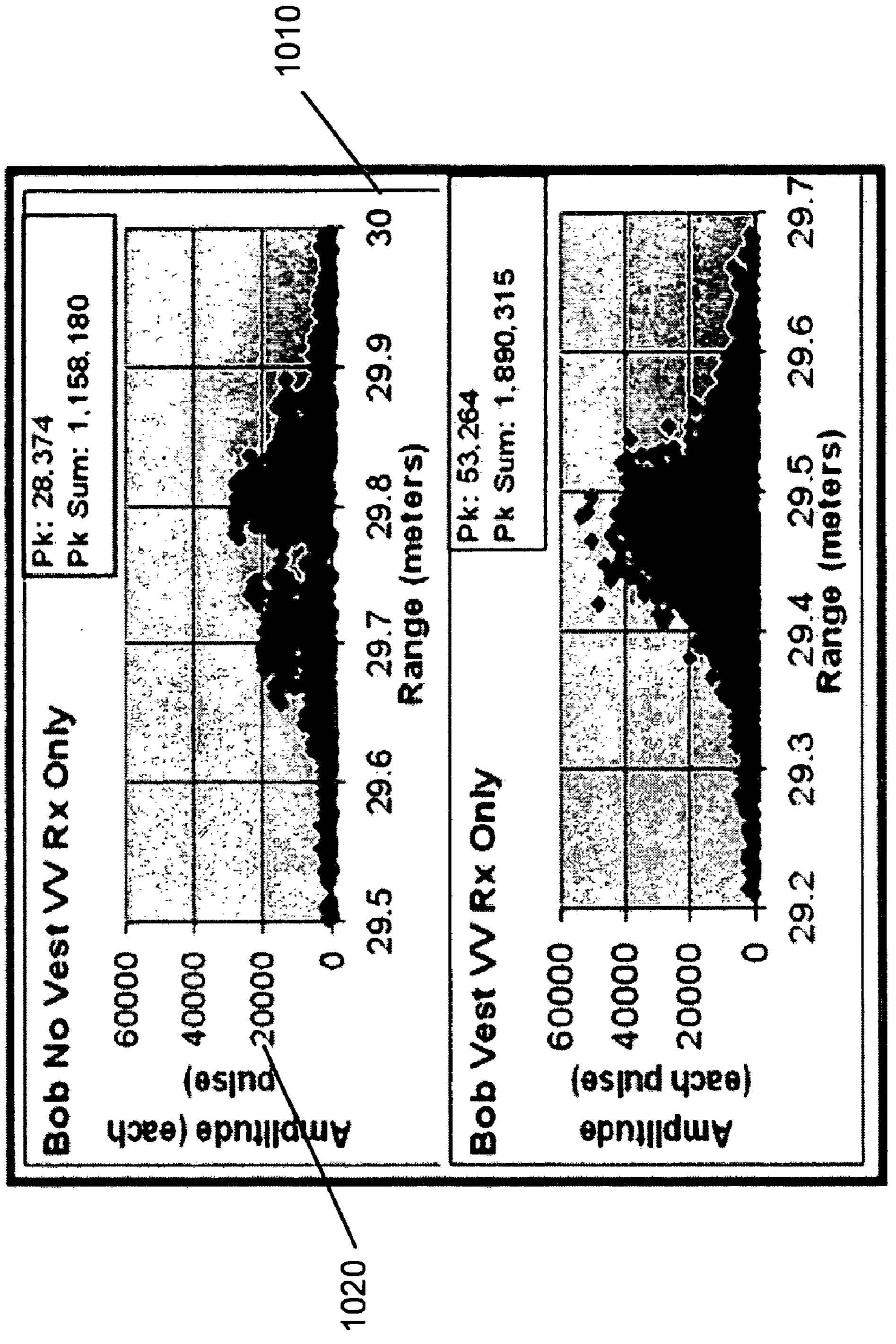
FIG. 10 illustrates raw signal return plots indicative of a threat and a non-threat.

FIG. 10 shows a typical plot of a Radar return. The x-axis 1010 is a measurement of the distance from the Radar. The y-axis 1020 is a power measurement for each pulse in normalized units. Similar plots can be generated for each channel, for single and multiple individuals, and polarization choices. In this case 4 seconds of data is shown. The peak signal achieved is determined by examining the returns in each 100 msec interval. The Peak Sum is the summation of all signals in the dominant 100 msec interval.

Clutter, which is defined as any returns that are not a result of the targets of interest, can play an important role in the ultimate system. Known objects are both clutter and valuable reference points. In particular, fixed objects (buildings, cars, poles, etc.) which will be detected by the Radar can serve as reference points and markers to allow for hand-off to other systems or personnel that are charged with the mission. As clutter, they have to be suppressed so that they do not desensitize the target detection process because of their size (buildings, cars, mailboxes, etc.) relative to a person. As valuable reference points, they provide range and azimuth clues that can keep the system design as simple as possible. They also have, in the case of fixed, stationary objects, fixed GPS coordinates that can be exploited for threat suppression. They define the "detection zone" and provide scene references. Creating a "detection zone" allows for clutter suppression by simple post-processing rather than complex Radar implementation techniques.

Figure 11:
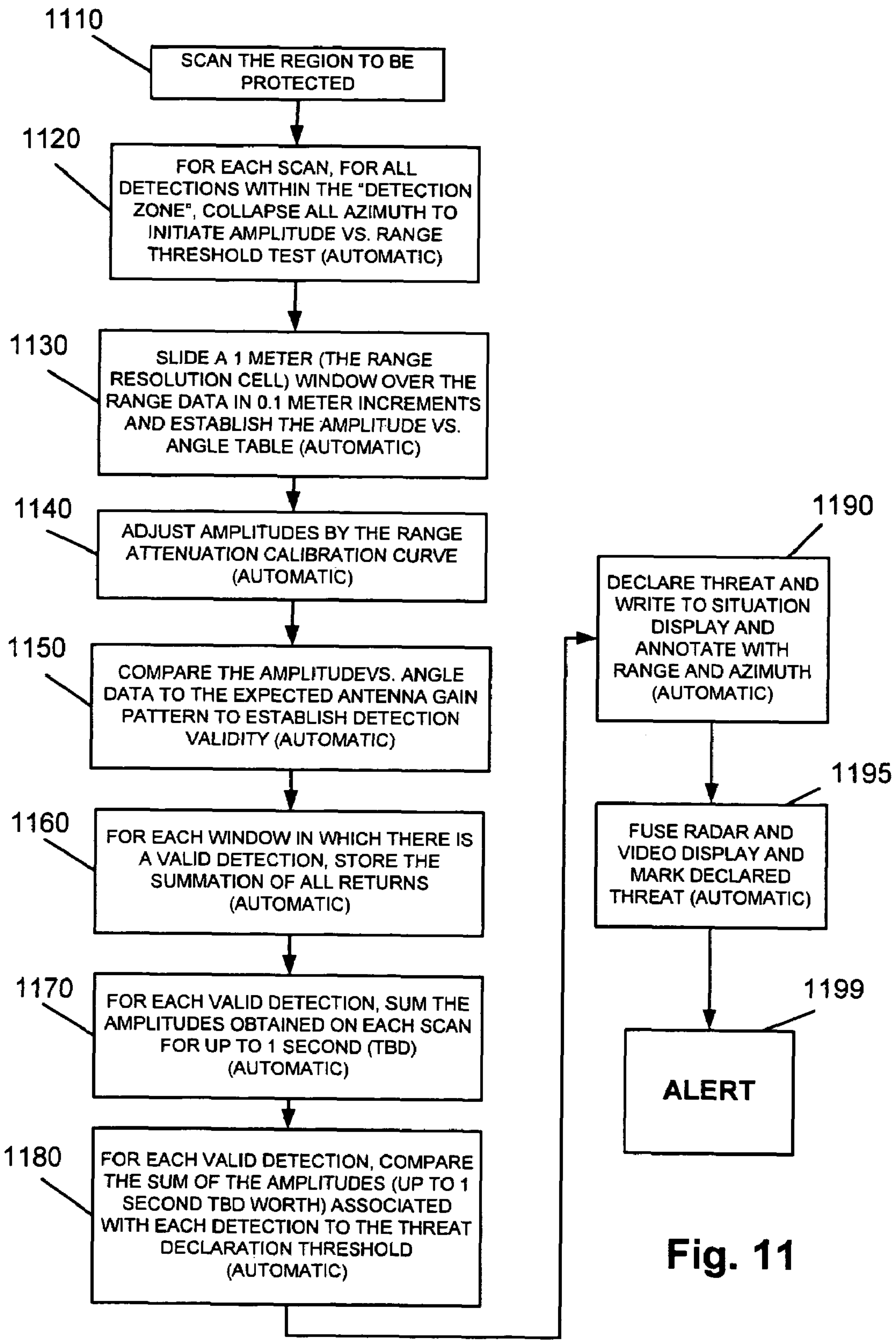
FIG. 11 illustrates a flowchart of operations consistent with the present invention.

FIG. 11 addresses what is done once the data starts coming in from the deployment. The process of threat declaration takes the human operator out of the loop as much as possible and presents no extraneous information that has to be interpreted.

The essence of the concept is that it is recognized that the way Radar interacts with complex targets is not well known or quantifiable. The final Radar signal processing will calibrate itself continuously, based on the average of the reflected energy at the time of measurement for the target dependent algorithms and by establishing the thresholds for the target independent algorithms at the time of the deployment on any given day. Both numbers improve as more targets are examined. The operations of FIG. 11 are applicable to both the target independent and target dependent threat detection systems.

In operation 1110, the region to be protected is scanned. Next, in automatic operation 1120, all azimuths in the "detection zone" which detect a target are identified, and the associated amplitude and range data is gathered for that target. Next, in 1130, a 1 meter (an exemplary range resolution cell) window slides in 0.1 meter increments over the range data to establish the amplitude vs. angle data to automatically populate the associated data (file) table.

In operation 1140, the amplitudes are automatically adjusted by the range attenuation calibration curve (algorithm). In automatic operation 1150, the actual amplitude vs. angle data is compared to the expected antenna gain pattern to establish the validity of the detection.

For each window in which there is a validated detection, the summation of all Radar returns is automatically stored in 1160. In 1170, the amplitudes obtained on each scan for up to 1 second are automatically summed. In 1180, for each validated detection, the sum of the amplitudes (up to 1 second worth) is automatically compared with the threat declaration threshold.

In operation 1190, if the threat declaration-threshold is exceeded, a threat is automatically declared, and the operator's display is automatically annotated with the range and azimuth of the threat target. In 1195, the video display and the Radar are automatically fused, and marked as a threat. In operation 1199, an alert is signaled (such as an aural alarm or visual alert symbol).

The technology incorporated in some embodiments described herein utilize the intensity and polarization characteristics of the Radar return from a potential threat together with system algorithms to remotely detect modest amounts of metal/dielectric that could indicate the presence of explosives or other concealed weapons. These embodiments, which would be capable of screening potential threats at ranges in excess of 50 meters, demonstrate a low-cost COTS (Commercial Off-The-Shelf) design which satisfies the requirements of civil law enforcement, force protection, military, and public safety in buildings and schools. While the invention has been particularly shown and described with reference to the preferred embodiments thereof, it will be understood by those skilled in the art that various changes in form and detail, including tradeoffs of Radar design parameter selection, may be made therein without departing from the spirit and scope of the invention.

The selection of a Radar system at frequency 77 GHz has several performance and cost advantages. From a performance standpoint, some of the components found in an explosive vest have dimensions comparable to the wavelength of the Radar. This fact indicates that any conductive components will be significant reflectors of electromagnetic (EM) energy. Second, the explosive component has a significant dielectric constant that will alter the EM field making it more likely to be detectable by this Radar.

The Radar return from a suicide vest is made up of reflections from all the components of the vest, which include wires and cylinders found in the vest, rifle barrels, weapons components, and the individual. The theoretical contribution of each of these components to the Radar backscatter can be derived from the Radar and Radar-Cross-Section equations. However, modeling is complicated by the orientation of the components and the complex interactions between the person wearing the vest and the vest components. An incomplete understanding of these interactions compounds modeling these complex interactions. In addition, at this frequency, the interactions change with small movements of the target.

The calculation of the signal strength and the signal strength dependencies as set forth below describe how the design parameters determine the performance of the system and how some of the design parameters are determined from the proposed system requirements. The energy reflected from a target competes with background noise from many sources. The Radar Range Equation rearranged to calculate Signal to Noise Ratio $$SNR = \frac{P_T G^2 \lambda^2 \sigma}{(4\pi)^3 R^4 K T_0 B N_F L_T}$$

explains the ability of the Radar to detect a target. The signal to noise ratio is directly proportional to the Transmitted Power, $P_T$, the square of the Antenna Gain, G, the square of the Wavelength, $\lambda$, and the Radar Cross Section of the target, $\sigma$, and inversely proportional to the fourth power of the distance to the target, R, the Bandwidth of the Receiver, B, the Noise Figure, NF, and miscellaneous Losses, $L_T$. K is the Boltzmann constant, and T is the receiver temperature in degrees Kelvin.

For an individual target threat, the elevation beamwidth at a distance to the target should encompass the height of the individual. Assuming an individual to be on the order of 2 meters, the calculation determines the resultant angle or beamwidth to be 1.15 degrees, for a proposed distance to the furthest target of 50 meters. The beamwidth determines the diameter of the antenna at the proposed frequency of 77 GHz.

The Diameter, D, equals a constant factor, typically 1.22, times the speed of light, c, and divided by the product of the beamwidth and the frequency, f, and equals 0.12 meters. The Diameter, D, is represented as $$D = \frac{1.22(c)}{(f)(\text{Beamwidth})}$$

The calculation of the Signal to Noise Ratio for an embodiment of the proposed solution is 2.8 dB or nearly twice the noise present in the system for a miniscule 0.1 square meter target. This suggests that even for the very modest transmitted power levels and conservative design parameters described herein, sufficient detectable signal will be available for the system to differentiate target backscatter from the noise background.

The unique visual characteristics of explosives vests consist of their size, shape, explosive charge, and fuse mechanism. Similarly the vest possesses unique Radar characteristics, including its reflectivity, polarization, resonance effects, and interference patterns.

Figure 12:
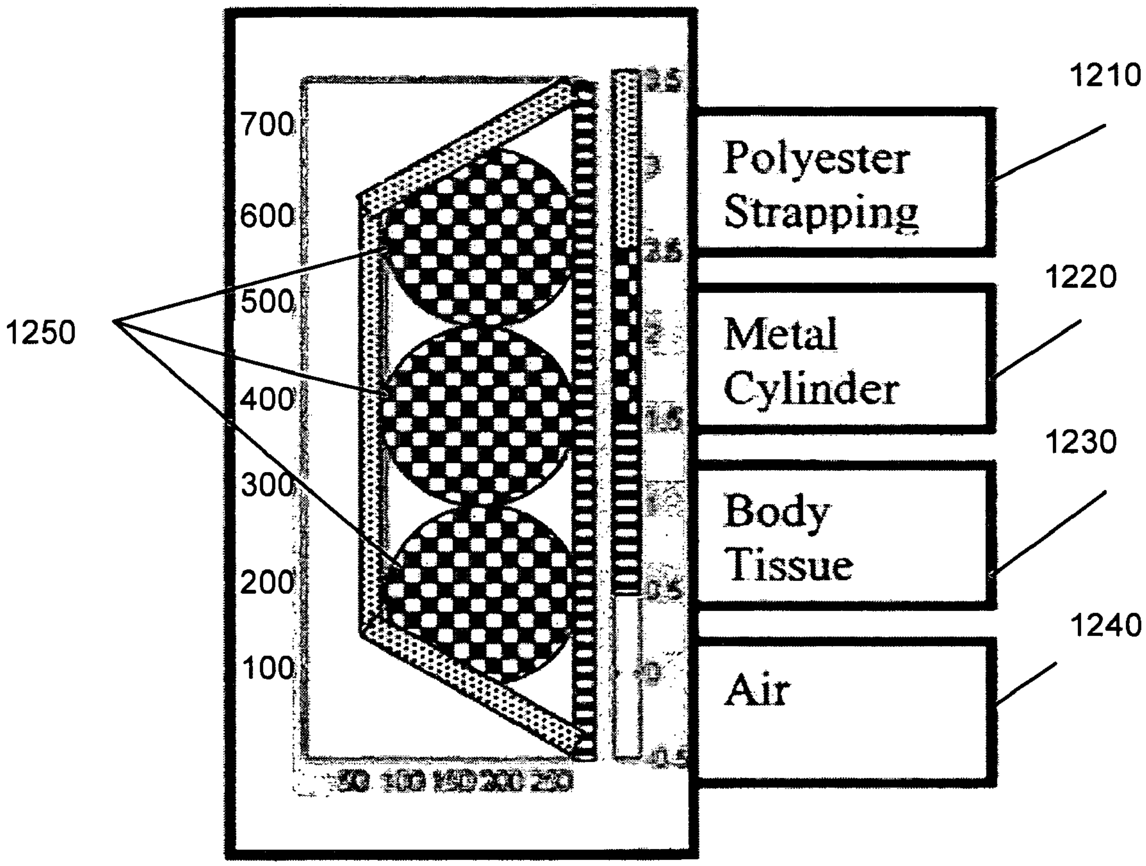
FIG. 12 illustrates the modeled geometry of a typical target that is a threat.

A finite difference frequency domain (FDFD) calculation of a realistic body-worn explosive geometry was conducted. Three infinitely long (into the page) 3 inch diameter perfectly conducting cylinders held in place against a planar half-space of human tissue by means of a sheet of polyester material 1 mm thick was used as the model (no clothing separating the cylinders from the body). The nearfield computational space was discretized into 237 by 749 square cells (FIG. 12), as seen looking down on the human with sides h=0.24 mm.

Assuming a 77 GHz uniform plane wave incident from the left with unity amplitude, polarized vertically to the ground, the scattered field due to the presence of the cylinders 1220 and the strapping 1210 (FIG. 12) was calculated. For the alternate polarization (with E-field parallel to both the ground and the body), the magnetic field, H_z was computed. It was observed that there is less scattering from the sides of the cylinders, but more in front (toward the left).

To compare the effects of the scattered signals from a human (represented by "body tissue" 1230 and surrounding air 1240), with and without the three circular metal cylinders 1250, the computed two-dimensional farfield distribution was approximately extended to three dimensions to account for the finite heights of the human and the cylinders. Approximating the human torso as a rectangle with height 100 cm and width 35 cm (about 3 feet by 14 inches), and the height of the cylinders being 25 cm (about 10 inches), it is reasonable to scale the 2D farfield signals by the heights of each target respectively. This follows from the fact that the farfield radiation pattern of an electrically large aperture is proportional to its illuminated area, and the target area is already being accounted for in the 2D computation. In each polarization case, the intensities are normalized to that of the rectangle of human tissue medium 1230 without the cylinders.

As would be expected, the sidelobes are higher when the human rectangle scatterer has the metal cylinders attached. The main beam signal for both human and cylinders is 92.5% (7.5% below) that of the human rectangle alone for horizontal polarization. For vertical polarization the cylinders add 7.7% signal level to 107.7% of the human alone. This is due to the strong scattering of the vertically oriented cylinders 1250 reflecting all of the vertically polarized electric field.

It was concluded from the simulation that while the predicted differences are small, there are distinct differences in the scattering of a torso with and without an array of metal cylinder explosives, depending on polarization and observation angle. Actual measurements corroborated that the differences exist and are exploitable. The effects of the much smaller cylinder array relative to the human torso would not be expected to be great, but the details of the variations may indeed be observable. In particular, illumination of the human target from directions other than normal to the skin—so that the main beam of the field scattered by the torso is away from the backscatter direction—may lead to enhanced relative scattering in the backscatter direction by the cylinders. Also, examining the cross-polarized waves, say when illuminating at +45 degrees (both vertical and horizontal illumination), and observing at −45 degrees, will be much greater for the torso with straight vertical cylinders than without.

While the invention has been particularly shown and described with reference to the preferred embodiments thereof, it will be understood by those skilled in the art that various changes in form and detail, including tradeoffs of Radar design parameter selection, may be made therein without departing from the spirit and scope of the invention.

What is claimed is:

1. A method of detecting a threat, the method comprising:

operating a multi-channel frequency modulated continuous wave radar module to transmit and receive both horizontally and vertically polarized waveforms;

operating a multi-channel pulse Doppler channel radar to transmit and receive both horizontally and vertically polarized waveforms;

making a first independent threat assessment based on received multi-channel frequency modulated continuous wave signals;

making a second independent threat assessment based on received Doppler channel radar signals; and based on the first and second independent threat assessments making a threat determination.

2. The method of claim 1, where making a first independent threat assessment includes making a threat assessment using a frequency modulated continuous wave population independent decision process.

3. The method of claim 2, where making a second independent threat assessment includes making a threat assessment using a pulse Doppler population independent decision process.

4. The method of claim 3 further comprising:

making a third threat assessment, the third threat assessment being a population dependent assessment based on the received multi-channel frequency modulated continuous wave signals; and wherein said step of making a threat determination is further based on said third threat assessment.

5. The method of claim 4, further comprising:

making a fourth threat assessment, the fourth threat assessment being a population dependent assessment based on the received Doppler channel radar signals; and wherein said step of making a threat determination is further based on said fourth threat assessment.

6. The method of claim 1, wherein said Doppler radar signals and said continuous wave radar signals are transmitted simultaneously.

7. The method of claim 3, wherein said first independent threat determination is a function of a frequency modulated continuous waveform transmitted using a vertical polarization and received on a horizontal polarization.

8. The method of claim 7, wherein said second independent threat determination is a function of a pulse Doppler waveform transmitted using a vertical polarization and received on a horizontal polarization.

9. The method of claim 7 wherein multi-channel frequency modulated continuous wave radar module supports both horizontal and vertical radar channels.

10. The method of claim 9 wherein multi-channel pulse Doppler radar module supports both horizontal and vertical radar channels.

11. A threat detection system, comprising:

a multi-channel frequency modulated continuous wave radar module configured to transmit and receive both horizontally and vertically polarized waveforms;

a multi-channel pulse Doppler channel radar configured to transmit and receive both horizontally and vertically polarized waveforms;

a first threat assessment module configured to make a first independent threat assessment based on received multi-channel frequency modulated continuous wave signals;

a second threat assessment module configured to make a second independent threat assessment based on received Doppler channel radar signals; and a threat declaration module configured to make a threat determination based on the first and second independent threat assessments.

12. The threat detection system of claim 11, wherein said first threat assessment module is configured to make a threat assessment using a frequency modulated continuous wave population independent decision process.

13. The threat detection system of claim 12, wherein said second threat assessment module is configured to make a second independent threat assessment using a pulse Doppler population independent decision process.

14. The threat detection system of claim 13 further comprising:

a third threat assessment module configured to make a population dependent threat assessment based on the received multi-channel frequency modulated continuous wave signals; and wherein said threat determination is configured to use said third threat assessment in making said threat determination.

15. The threat detection system of claim 14, further comprising:

a fourth threat assessment module configured to make a population dependent assessment based on the received pulse Doppler wave signals; and wherein said threat determination module is configured to use said fourth threat assessment in making said threat determination.

16. The threat detection system of claim 11, wherein a multi-channel frequency modulated continuous wave radar module and said multi-channel pulse Doppler channel radar are configured to transmit signals simultaneously.

* * * * *